Sept. 1, 1959 J. MULLER 2,902,158
UNCLOGGING FILTER
Filed Oct. 7, 1957 5 Sheets-Sheet 1

INVENTOR
JACQUES MULLER
BY Irwin S. Thompson
ATTORNEY

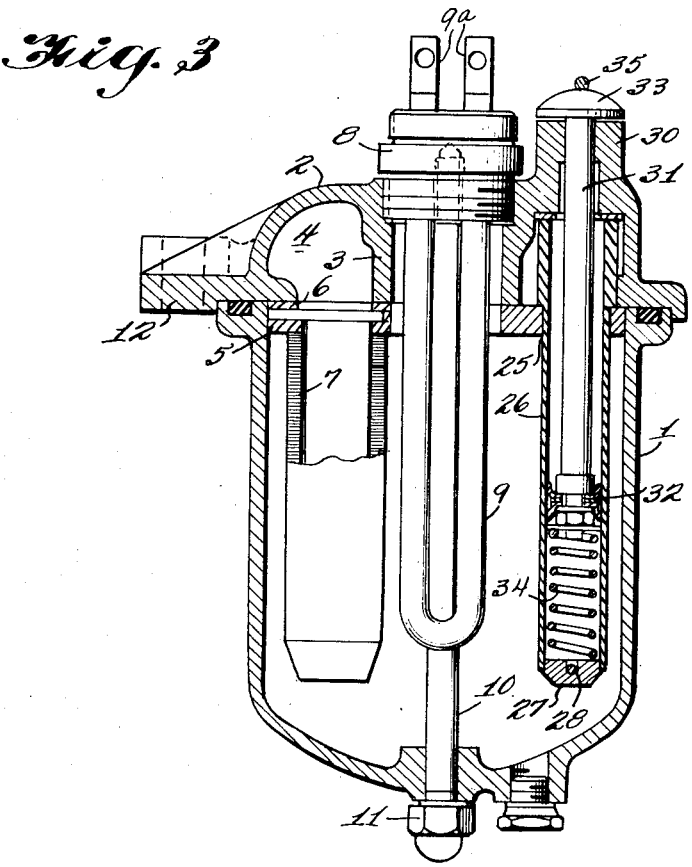
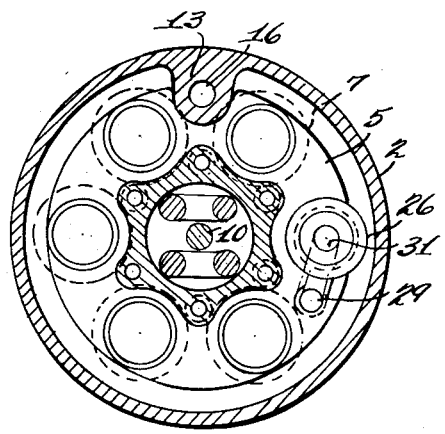

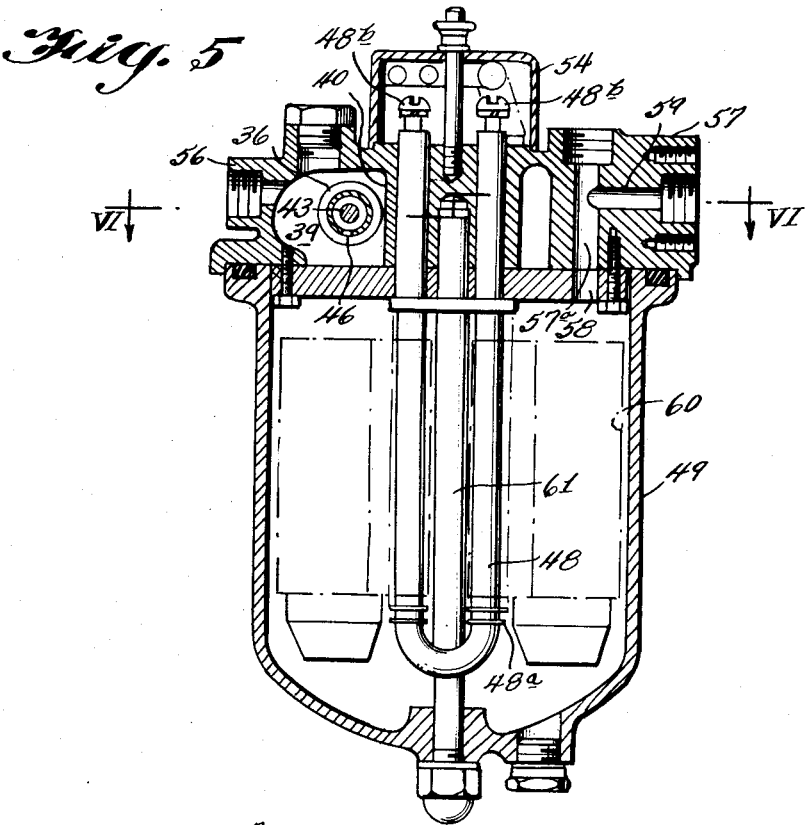
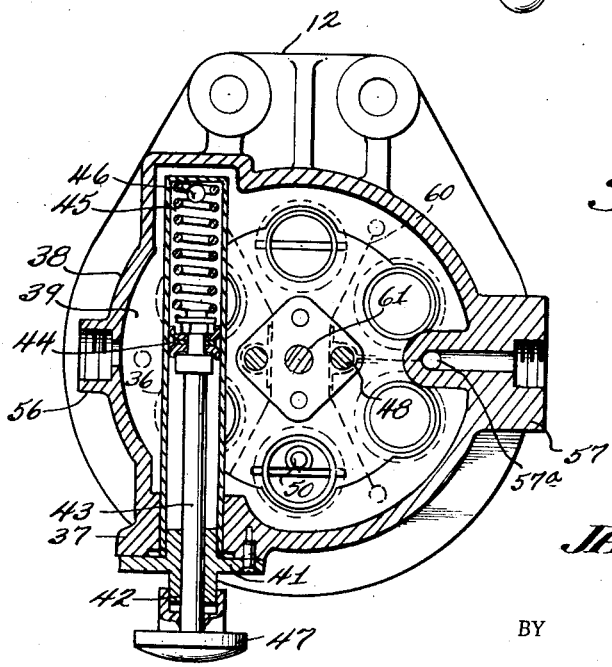

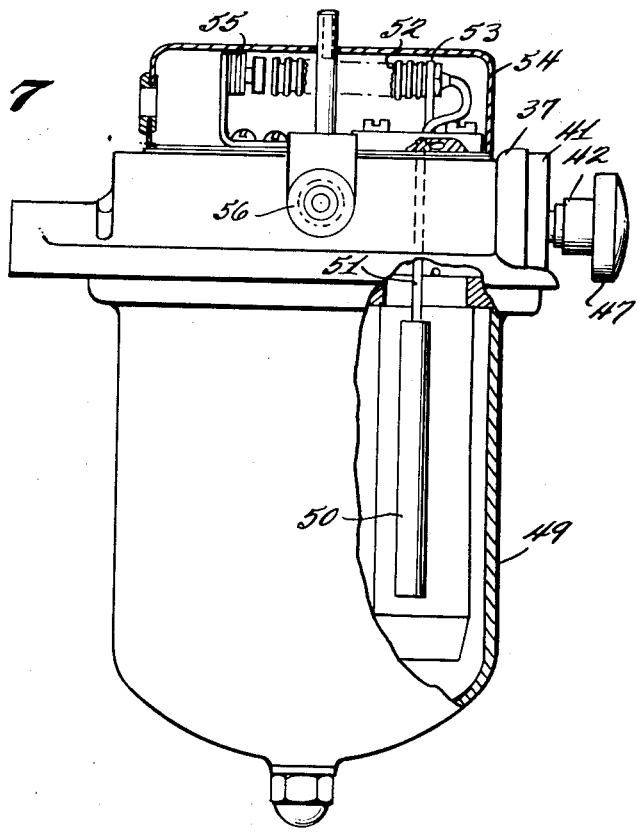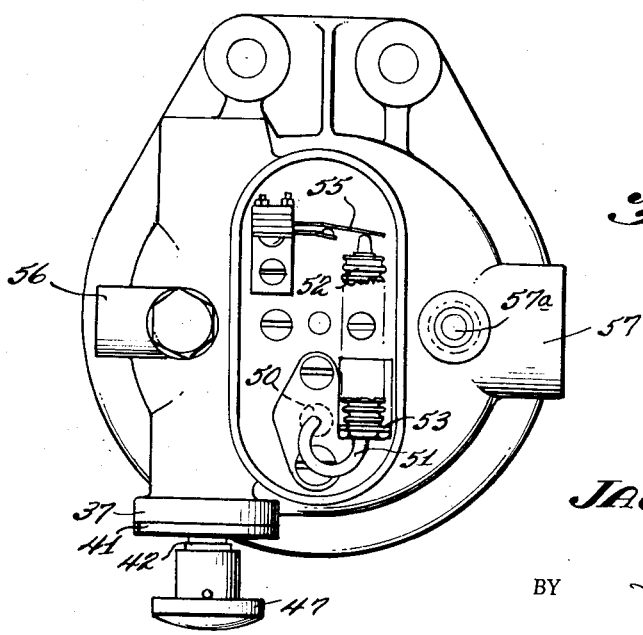

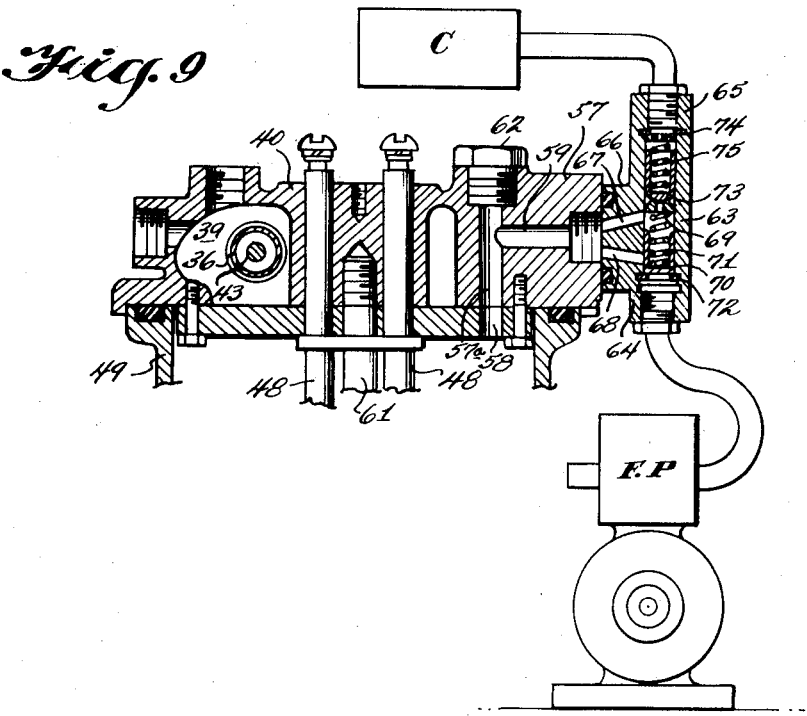

United States Patent Office 2,902,158
Patented Sept. 1, 1959

2,902,158

UNCLOGGING FILTER

Jacques Muller, La Garenne-Colombes, France

Application October 7, 1957, Serial No. 690,178

Claims priority, application France October 6, 1956

11 Claims. (Cl. 210—184)

This invention relates to filters and more particularly has reference to a filter provided with means for unclogging the filter.

It is known that many liquid or gaseous fluids contain impurities which must be eliminated by filtration before use. Furthermore, certain liquids, such as hydrocarbons, are formed by compounds having variable or different viscosities so that it is necessary to purify them at a given temperature, not only to prevent them from obstructing the capillary channels of the filtering elements, but also to maintain the homogeneity of the filtered product.

The object of the present invention is to create a filter, particularly for hydrocarbons, the feature of which is that it is equipped with a manual or automatic unclogging device including a pump acting by reversal of the direction of flow of the fluid treated and a heating device to maintain a temperature facilitating filtration.

A manual unclogging device permits an operator or driver to intervene periodically by operating the pump, for example each time the functioning of the filter varies to indicate to him that the output of the filtering elements has started to diminish.

An automatic unclogging device functions with no intervention of the operator or driver, for example under the influence of pulsations produced by a feed pump or another source feeding the fluid to be filtered under a periodically variable pressure.

According to this invention the filter can be fitted with any sort of filtering elements but gives the best results with so-called candle-filtering elements, formed by a stack of annular discs having on the two faces more or less microscopic furrows extending between the two edges thereof.

For more clarity there will be described several methods of carrying out the invention with reference to the accompanying drawings, by way of non-limiting examples, wherein:

Fig. 3 is a vertical sectional view taken on a plane perpendicular to that of Fig. 1.

Fig. 4 is a horizontal sectional view taken on line IV—IV of Fig. 1.

Fig. 5 is a vertical sectional view of a second embodiment of the filter constructed for manual unclogging.

Fig. 6 is a horizontal sectional view taken on line VI—VI of Fig. 5.

Fig. 7 is a side elevational view with parts in vertical section.

Fig. 8 is a plan view of the filter, offset by 90°, and the cover removed.

Fig. 9 is a fragmentary view in section similar to that of Fig. 5 but of a filter constructed for automatic unclogging.

Fig. 10 is a sectional view similar to that of Fig. 6 of the filter constructed for automatic unclogging.

Figure 1:
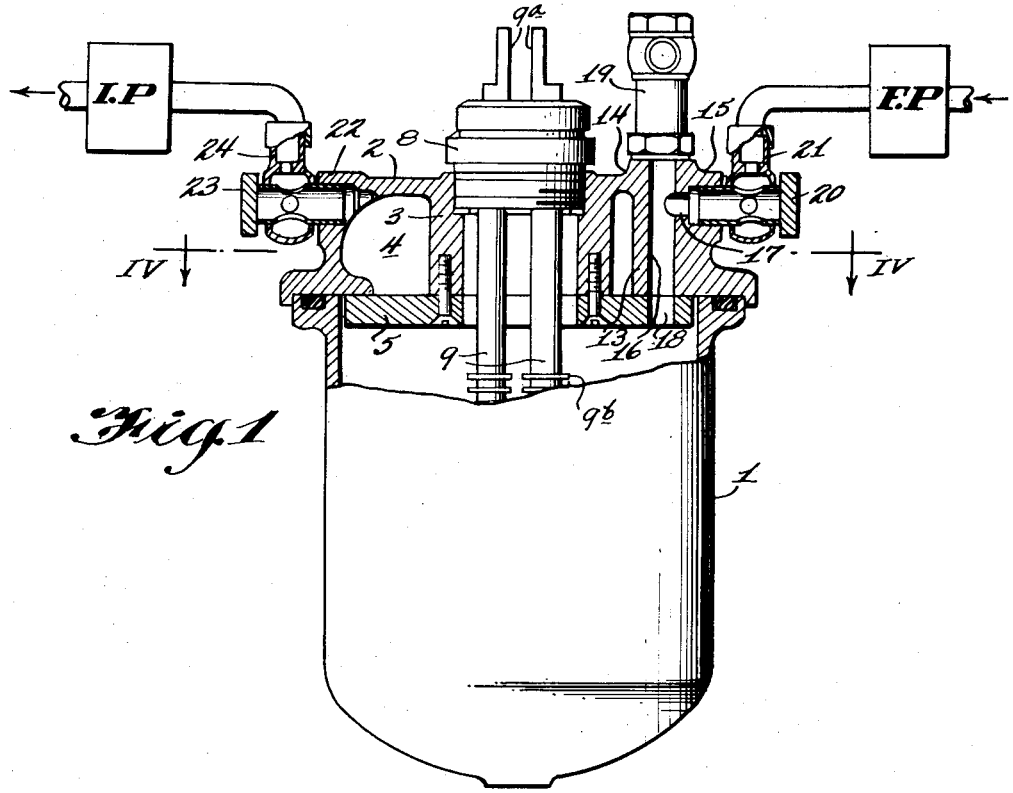
Fig. 1 is an elevational view partially in vertical section of a first embodiment of the invention of the filter constructed for manual unclogging.
Figure 2:
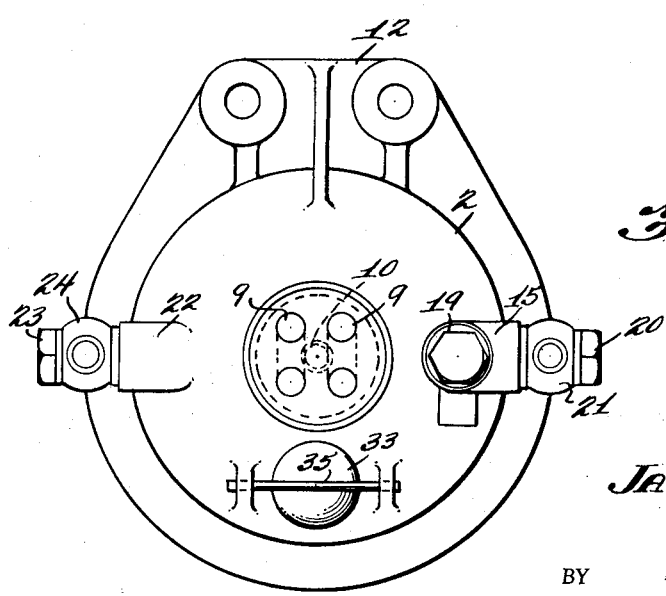
Fig. 2 is a plan view of the embodiment of Fig. 1.

In the example shown in Figs. 1 to 4 the filter comprises a bowl in the form of a cup 1, closed tightly by a hollow lid 2, which has an outer peripheral depending flange, the lower portion of which is formed to provide a seat for the upper portion of the bowl 1. Lid 2 also has a central cylindrical flange 3 extending downwardly therefrom and dividing the space within the hollow lid into a cylindrical central cavity and an annular chamber 4 surrounding the cavity and concentric with the latter. The annular chamber 4 is tightly closed by an annular disc 5 fixed to the lower end face of the flange or partition 3 by screws and held against the lower portion of the peripheral edge flange of the lid 2. The annular chamber 4 is thus separated and sealed from the chamber formed by the bowl 1.

In the annular disc 5 are cut circular orifices 6 uniformly spaced in a circular row, centered on the axis of the filter in which are embedded or fixed by any suitable means candle filters 7, which in this particular case are stacked filter discs furrowed or grooved on the two faces. These candle filters extend downwardly into the chamber formed by the bowl 1, when the filter is placed vertically, with the bowl then suspended from the lid 2.

In the central cavity of the lid 2 is screwed, from the outside, a plug 8 through which extends U-shaped heating elements 9, bent as hairpins and extending through the central opening of the annular disc 5 into the chamber provided by the bowl and provided with connectors 9a. These heating elements can have radiant vanes or fins 9b if desired. In the inner portion of the socket 8 is screwed an axial pin or rod 10, which passes through a central bore in the base of the bowl 1. The end of rod 10 is threaded to receive a nut 11. The rod 10 and nut 11 are constructed for the tight assembly of the bowl 1 and lid 2. The candle filter elements 7 and the heating elements 9 are fixed to the lid, respectively, by means of the annular disc 5 and socket 8. Thus it is easy to gain access to these elements by unscrewing nut 11 and withdrawing bowl 1. The lid 2 is fitted with a lateral flange 12, permitting its attachment to a suitable support of any kind whatever.

The lid 2 has on its inner periphery a boss 13, extending throughout the entire height, and the lower plane surface of which is flush with the lower peripheral edge of the lid. This inner boss is aligned with bosses 14 and 15 provided on the outer surface of the lid. The boss 13 is pierced with a longitudinal channel 16 extending from one end to the other and from which branches a lateral channel 17 opening into the exterior surface of the lateral projection 15. The longitudinal channel 16 is aligned with an orifice 18 provided in disc 5. In the boss 14 is screwed a tubular fitting 19 containing a safety valve. In the boss 15 is screwed a tubular trunnion in the form of a cup 20 on which is pivotally mounted without leakage a coupling 21, which communicates with the interior of the tubular trunnion through lateral orifices.

At a diametrically opposed point the lid has a hollow exterior boss 22 communicating with the chamber 4 and in which is screwed a tubular trunnion in the form of a cup 23, on which is pivotally mounted without leakage a coupling 24 which communicates with the interior of the tubular trunnion through lateral orifices.

In an eccentric circular orifice 25 of disc 5 there is secured a cylindrical pump body 26 which extends down into the bowl 1 close to the bottom thereof, and of which the lower end is closed by a closure 27 in which is provided a channel 28 connected to a conduit 29 rising along the body of the pump and opening through the disc 5 into the chamber 4 of the lid. The body of the pump is extended above disc 5 and abuts with a tight joint against a plane seat provided in the under surface of the top of the lid. An exterior boss 30 having a bore centered on the axis of the body of the pump is provided on the surface of the lid. In this bore is guided and slidably mounted a rod 31 connected to piston 32 of the pump and carrying at its outer end an operating knob or button 33. A compression spring 34 positioned between the closure 27 and the piston 32 tends to urge the latter upwardly toward the lid 2. In idle position, that is to say in the lower position of piston 32, the spring 34 is compressed and knob or button 33 rests on boss 30 and is held and locked by pivoted stirrup 35. To release the knob or button 33 it is thus sufficient to swing stirrup 35 laterally, and spring 34 compressed up to this point then acts to repel piston 32.

The operation is the following:

In the idle position of the pump, as shown in Fig. 3, the fluid to be filtered enters through connection 21, passes through trunnion 20, channels 17, 16 and orifice 18 into the chamber of the bowl 1 (Fig. 1), and then flows from the outside to the inside of the filtering elements 7 (Fig. 3), which retains the impurities on the outer periphery. The fluid thus purified enters chamber 4 of the lid and discharges through the boss 22, trunnion 23, and connection 24 (Fig. 1), and is then led to the point of use.

For the purification of a liquid, the viscosity of which is reduced by heating, the heating elements 9 put in circuit bring it to a temperature such that its viscosity facilitates filtration while preventing obstruction of the filtering elements.

When the operator or driver, warned by a reduction in the flow or by another change in operation, deems it necessary to unclog the filtering elements, he swings the stirrup 35, releasing the knob or button 33. The spring 34 held in compression up to then now urges the piston 32 with the rod 31 and the knob or button upwardly, and the pump draws the purified fluid from the chamber 4 of the lid through conduit 29 and the channel 28 of closure 27.

It is assumed that the filter is interposed between a volumetric feed pump F.P. upstream and a volumetric injection pump I.P. downstream, these pumps permitting no passage of liquid or gaseous fluid in excess of a predetermined flow. It is intended of course to provide non-return valves preventing any return of the fluid.

To unclog the filters, the operator pushes knob or button 33 which lowers piston 32 against the action of spring 34. It thus discharges the fluid drawn into the pump and returns it to chamber 4 of the lid and increases the pressure so that the purified fluid contained in the chamber 4, and in the filtering elements 7 passes through the latter in the direction opposite to the flow during filtration, removing the impurities adhering to the outer surface of the filtering elements. The unpurified fluid fills the chamber of bowl 1, and a part of this unpurified fluid corresponding to the part discharged by the pump must be able to escape to the outside. Since the feed pump connected to fitting 21 permits no return, fitting 19 is provided with a safety valve which communicates with a collector adapted to receive the fluid polluted by the impurities removed from the filtering elements and arranged to retain the impurities. Of course the safety valve must be calibrated in such a way that it only opens at a pressure greater than that of the feed pump, such as produced by a pressure forcibly exerted on the control knob or button 33 of the unclogging pump.

The construction of the filter shown in Figs. 5 to 8 is similar to that described in regard to Figs. 1 to 4, and the difference consists essentially in that the body of the pump is mounted transversally in the lid.

The body of pump 36 is mounted in a lateral boss 37 of the lid 38 and extends horizontally in chamber 39 on one side of a solid central boss 40. The body of the pump is screwed onto the hub of a supporting disc 41 fixed to the plane outer face of the boss 37 by screws. The outer face of the disc 41 is provided with a central tubular nipple 42 externally threaded. A central bore extends through the hub and tubular nipple for slidably receiving a piston rod 43 to which is connected the pump piston 44. Between the piston 44 and the bottom of the pump body is positioned a compression spring 45. Adjacent the bottom of the pump body the pump chamber communicates with the chamber 39 by at least one lateral orifice 46. An actuating knob or button 47 is fixed on the outer end of the rod 43 in any suitable manner, and it has on its inner face a cylindrical cavity with an internal thread designed to be screwed on the externally threaded nipple 42 to lock piston 44 in its idle position as shown in Fig. 6.

In the boss 40 are provided bores parallel to the axis of the filter and adapted to receive heating elements 48, which in this case are electric resistance elements provided with radiant fins or vanes 48a and electrical connectors 48b. This filter is completed by a thermostat adapted to determine and stabilize the temperature of the fluid to be filtered which is received in the chamber of the bowl 49. The heat-sensitive element 50 of the thermostat is immersed in the fluid which is contained in the chamber of the bowl, and communicates through a conduit 51 with a tubular bellows 52 fixed at one end to a bracket 53 mounted on the upper surface of the lid 38 and protected by a removable housing 54. The free end of the tubular bellows which is displaced by variations in temperature of the fluid in the bowl shifts one of the two blades of a switch 55 interposed in the circuit of the heating elements 48.

On the side of the pump, the lid 38 is provided with a hollow boss 56 communicating with the chamber 39 and adapted for the discharge of the purified fluid to the point of its use.

On the side diametrically opposite to the pump, the lid is provided with a boss 57 extending both inwardly and outwardly and provided with a channel 57a parallel to the axis of the filter and communicating with the chamber of the bowl 49 through an orifice 58 in the disc supporting the filtering elements. From the longitudinal channel 57 extends a lateral channel 59 opening on the outer face of the boss.

The bowl 49 is divided in its interior by radiating radial partitions 60 into heating compartments each receiving a filtering element. These partitions are fixed to the element fixed on the rod 61 for assembly of the bowl 49 and the lid 38.

The operation of this filter is identical to that described for the filter shown in Figs. 1 to 4, except that the operator must unscrew knob or button 47 to release it and the pump plunger.

To make the filter just described and shown in Figs. 5 to 8 function automatically, it must be modified in the manner indicated in Figs. 9 and 10 wherein the corresponding elements are designated by the same numerals.

It will be noted that for the pump the only difference consists in that the compression spring 45a is interposed between the piston and the pump supporting disc 41. There is no need to provide a locking device for the knob or button 47 because the spring 45a has a tendency to hold it against the supporting disc 41.

On the side of the lid diametrically opposite the pump, the longitudinal channel 57a is plugged at its upper outer end by a plug 62 while the lateral channel 59 is complemented by a distributor.

This distributor comprises a tubular body 63 in which is provided a longitudinal bore, the two ends of which are shaped into tubes with internal threads for connection to the feed pump and the collector of fluid polluted by impurities removed from the filtering elements. In Fig. 9 the lower tubular portion 64 is adapted to be connected to the feed pump F.P., whereas the upper tube 65 is connected to the collector C.

The tubular body 63 is provided with a lateral plane surface base 66 which is to be fixed to the lateral plane surface of the boss through which the channel 59 opens. In the base 66 are provided two channels 67 and 68 communicating with the channel 59 and opening into the bore of the body 63 at two longitudinally spaced points. The bore of body 63 has a shoulder 69 with a central orifice beyond channels 67 and 68. At the level of the orifice of channel 68 there is mounted in the bore a slide valve 70, between which and the shoulder 69 there is interposed a compression spring 71 tending to hold the slide valve in contact with an annular stop 72 embedded in the body. The length of this slide valve is selected such that the orifice of channel 67 will be uncovered as soon as the slide valve touches the stop 72.

On the side of shoulder 69 opposite the slide valve 70, the bore contains a check valve 73 mounted to slide and between which and a perforated stop 74 is interposed a spring 75 tending to hold the check valve against the seat formed by the shoulder. The spring 71 is calibrated in such a way that it can yield to the pulsations produced by the feed pump connected to the tubular portion 64, whereas the spring 75 is calibrated in such a way that it can yield to the thrust of spring 45a for opening the check valve 73.

Under these conditions the operation is as follows:

Each time the feed pump discharges, the pressure generated repels the slide valve 70 against the action of spring 71 in such a way that it uncovers the orifice of channel 68 and at the same time covers the orifice of channel 67. The fluid to be purified then passes into the chamber of the bowl 49, passes through the filtering elements, and enters chamber 39 of the lid, and finally is discharged through the hollow boss 56 toward the point of use. But the pressure of the discharge also propagates through the orifice 46 in the body of the pump and shifts piston 44 against the action of spring 45a. During the next intake stroke of the feed pump, the slide valve 70 returns to its stop 72 under the action of spring 71 and masks the orifice of channel 68 but uncovers the orifice of channel 67. The spring 45a can then move the piston 44 which discharges a part of the fluid filtered through the filtering elements in the direction opposite to the direction of filtration, and the mixture of fluids and impurities removed passes through orifice 58, channel 57a, channel 59, and channel 67 into the tubular body 63, repels the check valve 73 to open it, and discharges through tube 65 to the collector. The cycle recommences with the start of the subsequent discharge stroke of the feed pump.

It is understood that the embodiments described are only intended to serve as examples and that many variation or modifications or uses can be made without departing from the spirit or scope of the invention.

Having described my invention, I claim:

1. A filter for fluids comprising filter means, pulsating means for effecting a flow of the liquid to be filtered in one direction through the filter means, and means including a pump for effecting a flow of filtered fluid through the filter means in a direction opposite that of the fluid to be filtered to remove from the filter impurities deposited thereon and means actuated by the pulsation of the flow of liquid for operating said pump.

2. A filter for fluids comprising a filter chamber, filter means in said chamber, means for effecting a flow of the liquid to be filtered in one direction through the filter means, means including a pump for effecting a flow of filtered fluid through the filter means in a direction opposite that of the fluid to be filtered to remove from the filter impurities deposited thereon, and thermostatically controlled electric heating means in said chamber for heating the fluid to be filtered to reduce its viscosity and facilitate its filtration.

3. A filter for fluids comprising a bowl forming an inlet chamber for receiving the fluid to be filtered, a hollow lid closing the bowl and having a discharge chamber for receiving filtered fluid, a partition separating the inlet chamber in the bowl from the discharge chamber in the lid, filter elements carried by the partition and extending into the bowl, an unclogging pump having a cylinder communicating at one end with the discharge chamber, a piston slidably mounted in the pump cylinder, spring means urging the piston away from said one end to draw fluid into the pump cylinder from the discharge chamber, and means for shifting the piston in the cylinder against the spring means to force fluid from the cylinder back into the discharge chamber and from the discharge chamber through the filter into the inlet chamber to clear the filter.

4. A filter for fluids comprising a bowl forming an inlet chamber for receiving the fluid to be filtered, a hollow lid closing the bowl and having a discharge chamber for receiving filtered fluid, a partition separating the inlet chamber in the bowl from the discharge chamber in the lid, filter elements carried by the partition and extending into the bowl, an unclogging pump having a cylinder communicating at one end with the discharge chamber, a piston slidably mounted in the pump cylinder, spring means urging the piston towards said one end of the cylinder to eject fluid from the pump, and a reciprocating feed pump for feeding fluid to be filtered to the inlet chamber during its discharge stroke and to force the fluid through the filter into the discharge chamber and into the unclogging pump against the action of the spring, said spring being of sufficient strength to force the fluid from its cylinder back through the discharge chamber and the filter into the inlet chamber during the intake stroke of the feed pump.

5. A filter according to claim 4 further comprising a distributor interposed between the feed pump and the inlet chamber and operable in response to pressure produced by the feed pump to connect the inlet chamber to the feed pump during the feed stroke of the feed pump and to connect the inlet chamber to a collector of impurities during the suction stroke of the feed pump.

6. A filter according to claim 3 further comprising heating elements mounted on the lid and extending downwardly through the partition into the bowl forming the inlet chamber.

7. A filter according to claim 6 further comprising a thermostatic device having a temperature-responsive element in the inlet chamber and a switch on the lid for controlling operation of the heating elements.

8. A filter according to claim 6 in which the heating elements are provided with radiant fins.

9. A filter according to claim 4 further comprising heating elements mounted on the lid and extending downwardly through the partition into the bowl forming the inlet chamber.

10. A filter according to claim 9 further comprising a thermostatic device having a temperature-responsive element in the inlet chamber and a switch on the lid for controlling operation of the heating elements.

11. A filter according to claim 9 in which the heating elements are provided with radiant fins.

References Cited in the file of this patent

UNITED STATES PATENTS

| 1,354,604 | Duggan | Oct. 5, 1920 |
| 1,512,977 | Depue | Oct. 28, 1924 |
| 1,866,970 | Garland et al. | July 12, 1932 |
| 2,400,200 | Katcher | May 14, 1946 |

FOREIGN PATENTS

| 796,664 | France | Jan. 27, 1936 |